US009970224B2

United States Patent
Gompper et al.

(10) Patent No.: US 9,970,224 B2
(45) Date of Patent: May 15, 2018

(54) HINGE ASSEMBLY FOR AN INSULATED GLASS DOOR

(71) Applicants: Brion Gompper, Lakewood, NJ (US); James Rowland, Bayville, NJ (US); Zohreh Erfan, Toms River, NJ (US)

(72) Inventors: Brion Gompper, Lakewood, NJ (US); James Rowland, Bayville, NJ (US); Zohreh Erfan, Toms River, NJ (US)

(73) Assignee: COMPONENT HARDWARE GROUP, INC., Lakewood, NJ (US)

( * ) Notice: Subject to any disclaimer, the term of this patent is extended or adjusted under 35 U.S.C. 154(b) by 0 days. days.

(21) Appl. No.: 15/057,801

(22) Filed: Mar. 1, 2016

(65) Prior Publication Data

US 2017/0009503 A1    Jan. 12, 2017

Related U.S. Application Data

(60) Provisional application No. 62/189,585, filed on Jul. 7, 2015.

(51) Int. Cl.
*A47B 49/00*    (2006.01)
*E05D 11/00*    (2006.01)
(Continued)

(52) U.S. Cl.
CPC .............. *E05D 11/00* (2013.01); *A47B 97/00* (2013.01); *E05D 3/02* (2013.01); *E05D 7/00* (2013.01); *E05D 11/0081* (2013.01); *E05F 1/063* (2013.01); *E06B 3/67* (2013.01); *F21V 23/06* (2013.01); *F21V 33/006* (2013.01); *F24D 13/026* (2013.01); *F24D 13/028* (2013.01); *E05Y 2800/104* (2013.01);
(Continued)

(58) Field of Classification Search
CPC ....... E05D 11/00; E05D 11/0081; E05D 3/02; F25D 23/028; F25D 23/02; Y10T 16/557; A47B 97/00; F21V 23/06; F21V 33/006; E06B 3/67; F24D 13/028; F24D 13/026; E05F 1/063; E05Y 2800/104; E05Y 2800/106
USPC ......................... 312/405, 326, 329; 200/61.7
See application file for complete search history.

(56) References Cited

U.S. PATENT DOCUMENTS 3,838,234 A  *  9/1974  Peterson ................ H01H 3/162
                                                          200/61.7
3,842,386 A  *  10/1974  Suska .................... H01R 35/02
                                                            174/86
(Continued)

FOREIGN PATENT DOCUMENTS

EP            0547838 A1 *  6/1993  ............. H01R 35/04

*Primary Examiner* — Jerry E Redman
(74) *Attorney, Agent, or Firm* — Francis C. Hand; Carella, Byrne, et al

(57) ABSTRACT

The hinge assembly comprises a housing for mounting on a cabinet and a post member for mounting on a door and for rotation relative to the housing. A first electrical contact is mounted within the housing for connection to a source of electrical power in the cabinet and a second electrical contact is disposed in the post in electrical contact with the first contact for connection to an electrical appliance in the door. In one embodiment, the electrical contacts rotate relative to each other as the post member pivots on the housing while in other embodiments; the electrical contacts remain stationary relative to each other as the post member pivots on the housing.

13 Claims, 12 Drawing Sheets

US 9,970,224 B2
Page 2

(51) Int. Cl.
  *E05F 1/06* (2006.01)
  *A47B 97/00* (2006.01)
  *E05D 3/02* (2006.01)
  *E05D 7/00* (2006.01)
  *E06B 3/67* (2006.01)
  *F21V 23/06* (2006.01)
  *F21V 33/00* (2006.01)
  *F24D 13/02* (2006.01)

(52) U.S. Cl.
  CPC ... *E05Y 2800/106* (2013.01); *E05Y 2800/672* (2013.01); *E05Y 2900/20* (2013.01); *Y02B 30/26* (2013.01)

(56) References Cited

U.S. PATENT DOCUMENTS

| | | | | |
|---|---|---|---|---|
| 3,860,312 | A * | 1/1975 | Gordon, Jr. | H01R 39/64 439/31 |
| 4,140,357 | A * | 2/1979 | Wolz | E05D 11/0081 174/86 |
| 4,412,711 | A * | 11/1983 | Suska | E05D 11/0081 16/223 |
| 4,671,582 | A * | 6/1987 | Stromquist | A47F 3/043 16/93 R |
| 6,083,010 | A * | 7/2000 | Daoud | E05D 11/0081 439/31 |
| 6,367,223 | B1 * | 4/2002 | Richardson | A47F 3/0434 312/116 |
| 6,724,285 | B1 * | 4/2004 | Zehrung | E05D 11/0081 335/205 |
| 7,824,200 | B2 * | 11/2010 | Bryla | E05D 11/0081 16/223 |
| 7,870,642 | B1 * | 1/2011 | Finkelstein | E05D 7/0423 16/242 |
| 8,505,164 | B2 * | 8/2013 | Katou | E05D 5/062 16/273 |
| 8,505,169 | B2 * | 8/2013 | Wood | E05D 5/04 16/223 |
| 8,650,714 | B2 * | 2/2014 | Staude | E05D 11/0081 16/385 |
| 8,702,481 | B1 * | 4/2014 | Wilbourn | B60J 9/04 296/19 |
| 8,753,129 | B2 * | 6/2014 | Worley | H01R 13/04 439/31 |
| 9,234,375 | B1 * | 1/2016 | Horng | G06F 1/1681 |
| 9,287,705 | B2 * | 3/2016 | Meyer | E05D 11/0081 |
| 9,487,981 | B1 * | 11/2016 | Aoki | E05D 11/0081 |
| 9,520,227 | B2 * | 12/2016 | Herglotz | E05D 11/0081 |
| 2002/0194702 | A1 * | 12/2002 | Hinkley | E05D 1/02 16/260 |
| 2003/0123232 | A1 * | 7/2003 | Huang | H04M 1/0216 361/751 |
| 2003/0230045 | A1 * | 12/2003 | Krause, Sr. | E06B 3/66 52/786.13 |
| 2006/0048340 | A1 * | 3/2006 | Zaderej | G06F 1/1616 16/385 |
| 2007/0068778 | A1 * | 3/2007 | Ulfik | E05D 11/00 200/6 R |
| 2010/0043293 | A1 * | 2/2010 | Nicholson | A47F 3/0434 49/70 |
| 2010/0115844 | A1 * | 5/2010 | Riley | E05D 11/00 49/70 |
| 2010/0205777 | A1 * | 8/2010 | Kim | E05D 11/0081 16/386 |
| 2012/0066864 | A1 * | 3/2012 | Boegel-Poetter | E05D 11/0081 16/273 |
| 2012/0235788 | A1 * | 9/2012 | Lakirovich | H02J 5/005 340/5.64 |
| 2012/0285089 | A1 * | 11/2012 | Artwohl | A47F 3/0434 49/70 |
| 2013/0081331 | A1 * | 4/2013 | Vullings | E06B 3/32 49/388 |
| 2014/0144083 | A1 * | 5/2014 | Artwohl | A47F 3/0434 49/70 |
| 2015/0117005 | A1 * | 4/2015 | Zanotto | F21V 21/26 362/249.1 |

\* cited by examiner

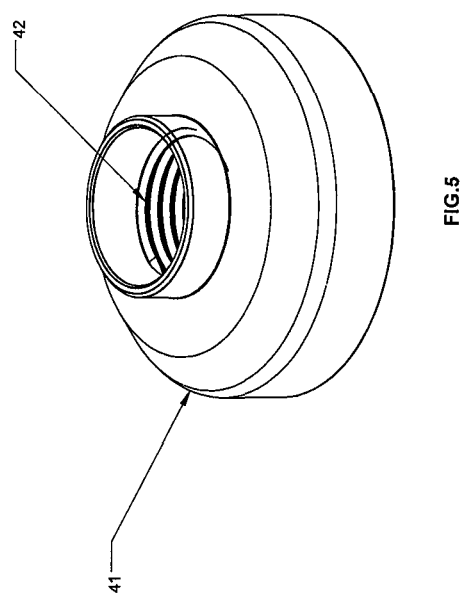
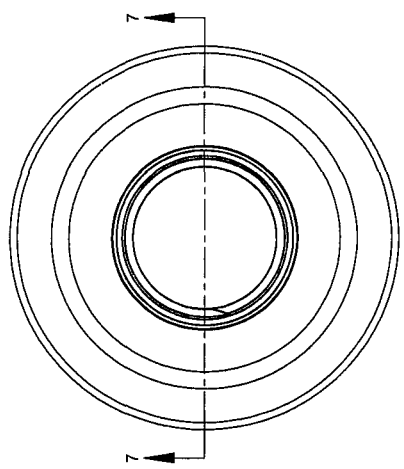
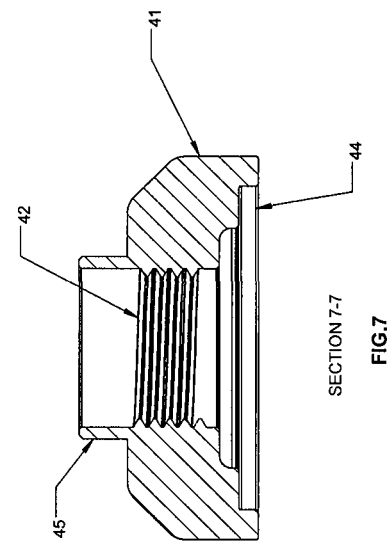

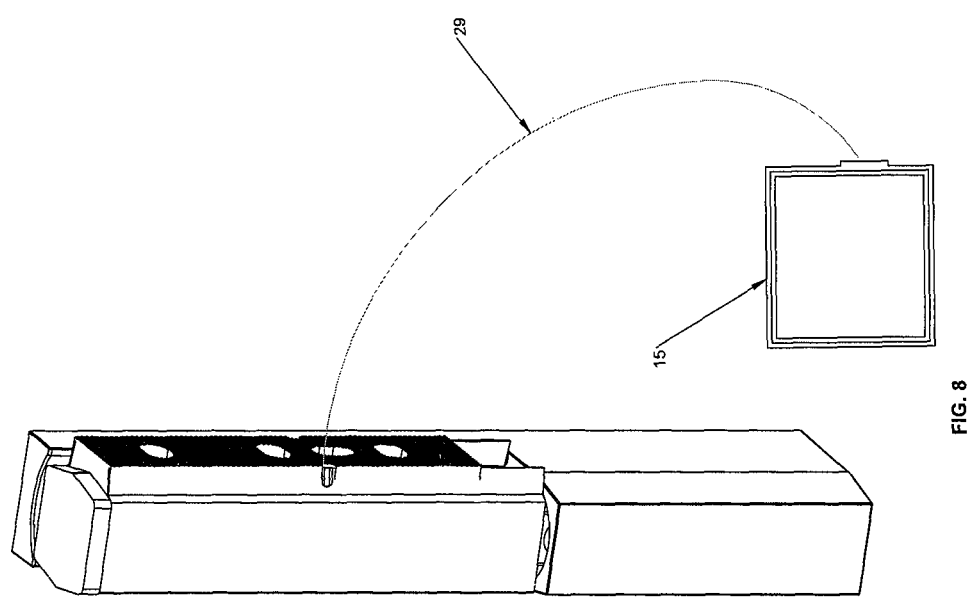

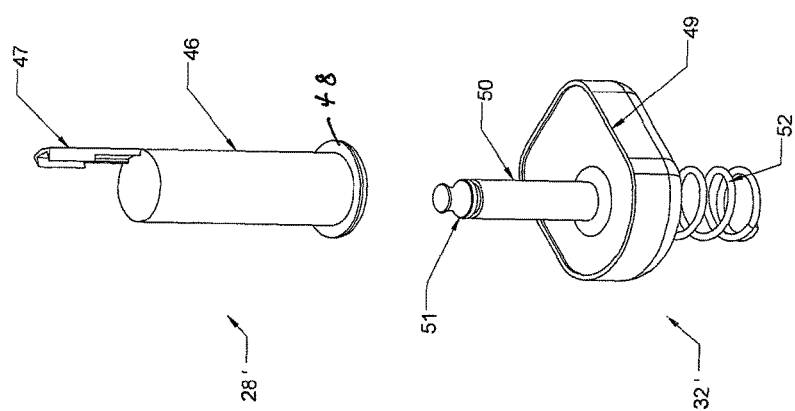
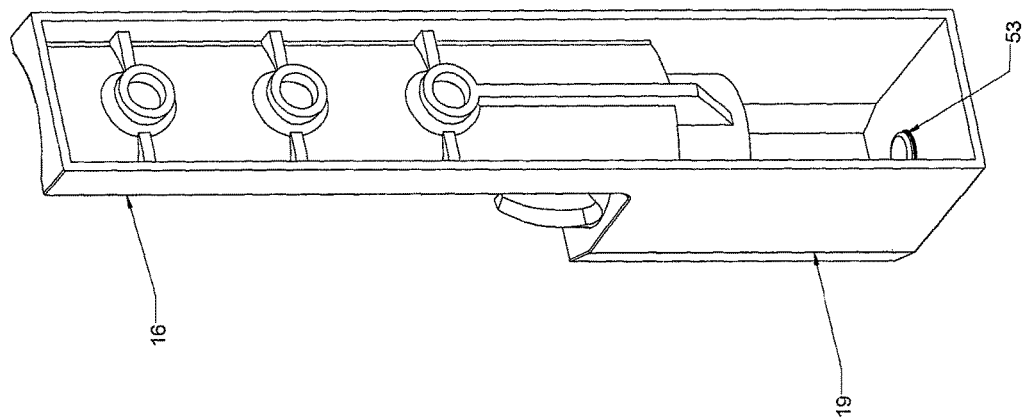
FIG. 12
FIG. 11

HINGE ASSEMBLY FOR AN INSULATED GLASS DOOR

This application claims the benefit of Provisional Patent Application 62/189,585, filed Jul. 7, 2015.

This invention relates to a hinge assembly for a door. More particularly, this invention relates to a hinge assembly for a door having an electrical appliance therein or thereon. Still more particularly, this invention relates to a hinge assembly for an insulated glass door having a light and/or heating means therein.

As is known, various doors have been constructed to be mounted in hinged fashion to a cabinet or within a door frame. In particular, doors have been constructed to be hinged onto the front of a cabinet, such as a refrigerated cabinet used in many supermarkets, and the like. Typically, such a door is constructed of an insulated glass unit (IG unit) of rectangular shape with at least a pair of glass panes (or lites) and a perimeter spacer system that functions as a means for maintaining the glass panes in parallel spaced apart relation. In addition, in some cases, the glass unit has been electrically heated to prevent surface condensation on the glass panes while, in other cases, a light fixture has been incorporated in the glass unit to illuminate the interior of the cabinet on which the door is mounted.

In situations where electrically heated glass is required, the IG unit can be provided with a transparent electrically conductive heating film bonded to at least one of the panes and a pair of electrically conductive bus bars mounted in electrical contact on the coated pane or panes of glass on opposite sides of the coated pane or panes of glass.

Various types of electrical connectors have also been employed to deliver electrical power to the doors with IG units, such as described in U.S. Pat. No. 3,760,157.

It is an object of the invention to provide a hinge assembly for a door that allows for the delivery of electrical power to an electrical appliance within the door.

It is an object of the invention to provide a hinge assembly for a door having an insulated glass unit that allows for the delivery of electrical power to an electrical light fixture within the door glass unit.

It is an object of the invention to provide a hinge assembly for a door having an insulated glass unit that allows for the delivery of electrical power to electrically conductive bus bars within the door glass unit.

It is an object of the invention to provide a hinge assembly for a door for a refrigerated cabinet having an insulated glass unit that allows for the delivery of electrical power to an electrical light fixture within the glass unit.

Briefly, the invention provides a hinge assembly for a door that is to be mounted on a cabinet, for example, a door including an insulated glass unit having at least a pair of glass panes disposed in parallel relation and defining a space therebetween and an electrical appliance within the space. The electrical appliance in the door may be light fixture having one or more fluorescent light bulbs or a series of LED lamps or may be a transparent electrically conductive heating film bonded to at least one of panes and a pair of electrically conductive bus bars mounted in electrical contact on the heating film.

The hinge assembly comprises a housing for mounting on the cabinet and a post member for mounting on the door and for rotation relative to the housing.

In accordance with the invention, the hinge assembly has a first electrical contact means mounted within the housing for connection to a source of electrical power in the cabinet and a second electrical contact means disposed in the post in electrical contact with the first contact means for connection to the electrical appliance in the door.

The housing of the hinge assembly has a wall for vertical deposition against the cabinet and a base projecting from one end of wall for receiving the first electrical contact means. In addition, the wall has an aperture and an electrical line extends from the electrical contact means in the base through the aperture and into the cabinet.

The post member of the hinge assembly has a wall for vertical disposition against the door and a depending tubular portion that is rotatably disposed in the base of the housing for rotation of the post member relative to the housing.

In one embodiment, the electrical contact means in the post is fixed relative to the post and is able to rotate with the post relative to the electrical contact means in the housing. When the post is mounted on the housing, electrical contact is made between the two contact means so that electrical power may be supplied from the power source in the cabinet to the appliance in the door.

In another embodiment, the electrical contact means in the post includes a barrel that is fixed in place to allow the post to rotate about the barrel and the electrical contact means in the housing includes an upstanding pin which is inserted into the barrel to complete an electrical circuit.

In a third embodiment, the electrical contact means disposed in the post is fixed relative to the electrical contact means in the housing and the post is rotatable relative to the electrical contact means in order to limit wearing of the two electrical contact means.

The hinge assembly may be constructed to position the door in different positions relative to the cabinet, such as described in U.S. Pat. No. 6,152,554. In this respect, the tubular portion of the post member fits within a bore in a cam member of the housing and the post member has a cam member with a circumferential cam surface which mates with a cam surface of the cam member on the housing 10. The cam surfaces are shaped so that as the post member pivots on the housing, the door may be moved from a closed position over the cabinet to an intermediate open position and then to a fully open position as is conventional. In addition, during pivoting of the post member on the cam member, the post member may move vertically upwardly.

These and other objects of the invention will become more apparent from the following description taken in conjunction with the accompanying drawings wherein:

FIG. 5 illustrates a perspective view of second component of the electrical contact means of FIG. 3;

FIG. 6 illustrates a top view of the component of FIG. 5;

FIG. 7 illustrates a cross-sectional view taken on line 7-7 of FIG. 6;

FIG. 8 illustrates a schematic view of the post member of the hinge assembly of FIG. 1 as connected to a light fixture in accordance with the invention;

FIG. 11 illustrates a rear perspective view of the housing of FIG. 9;

FIG. 12 illustrates an exploded perspective view of an electrical contact means for mounting in the housing of FIG. 11;

Figure 1:
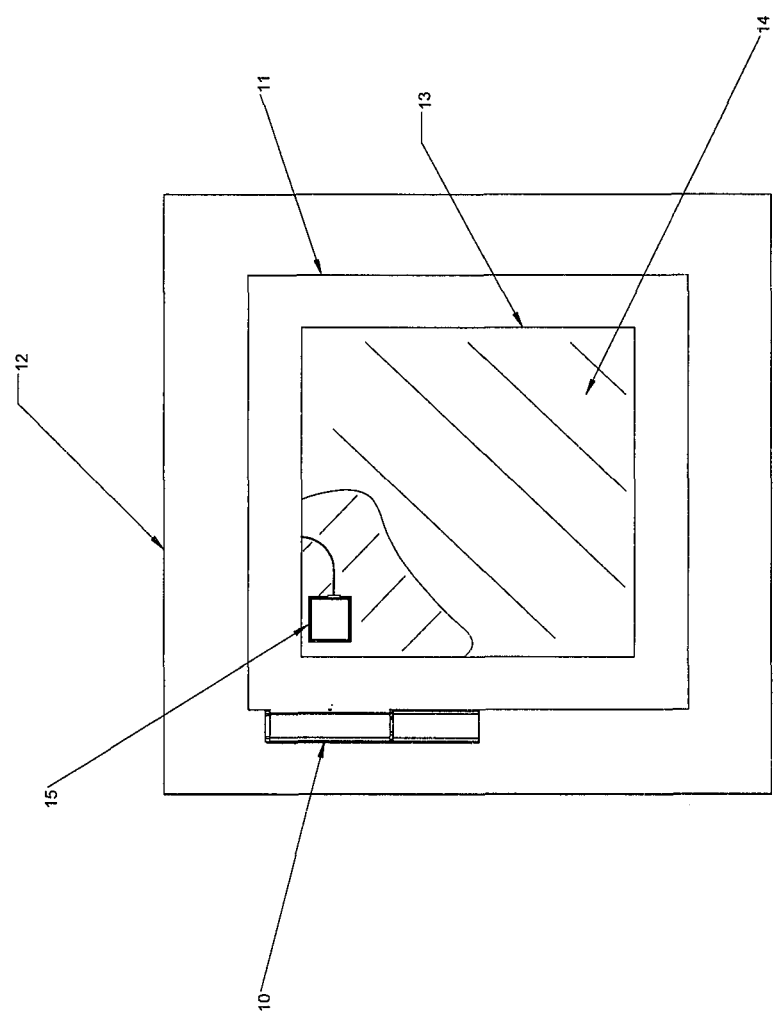
FIG. 1 illustrates a front view of a hinge assembly for a door that mounted on a cabinet in accordance with the invention.

Referring to FIG. 1, the hinge assembly 10 is constructed for mounting a door 11 on a cabinet 12 and, particularly, a door 11 with an insulated glass unit 13 of at least a pair of parallel glass panes 14 with one or more electrical appliances 15, such as a light and a heater, within the space between the glass panes 14.

The cabinet 12 is typically a refrigerated cabinet with a source of power (not shown) housed therein in a conventional manner.

Figure 2:
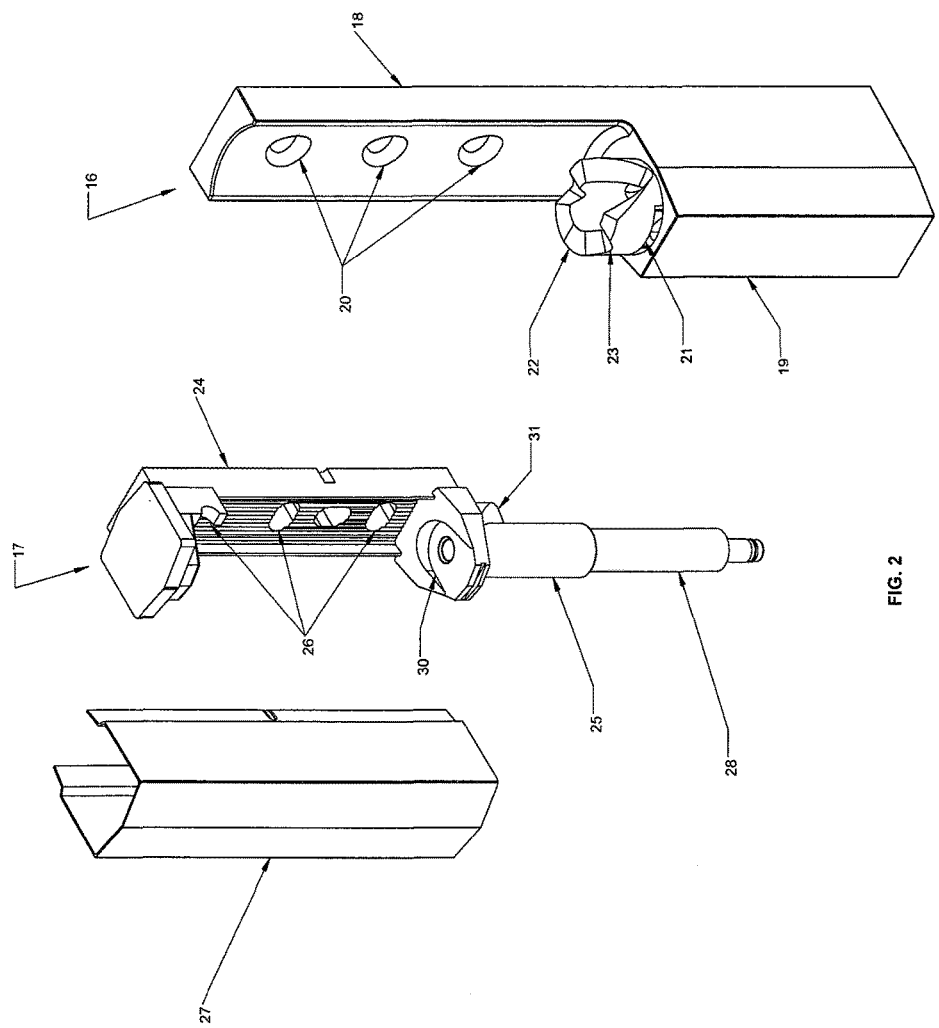
FIG. 2 illustrates an exploded perspective view of the hinge assembly of FIG. 1.

Referring to FIG. 2, the hinge assembly 10 includes a housing 16 for mounting on the cabinet 12 and a post member 17 for mounting on the door 11 and for rotation relative to the housing 16.

The housing 16 has a wall 18 for vertical deposition against the cabinet (not shown) and a base 19 that projects from the bottom end of the wall 18. The wall 18 has three apertures 20 which serve for the passage of mounting screws (not shown) for securing the housing to the cabinet 12. The base 19 is hollow for purposes as described below.

The housing 16 also includes a cam member 21 that is fixedly mounted in the base 19 to cause the post member 17 and door 11 to be moved vertically upwardly as is known. This cam member 21 has a circular cam surface 22 at the top for raising and lowering of the post member 17 and a central bore 23 concentrically within the circular cam surface 22. The cam member 21 is made of a plastic material, as is known, while the housing 16 is made of metal.

The post member 17 is made of one-piece metal and has a wall 24 for vertical disposition against the door 11 and a depending tubular portion 25 that is rotatably disposed within the bore 23 of the cam member 21 on the housing 16. The wall 24 has three apertures 26, two of which serve for the passage of mounting screws (not shown) for securing the post member 17 to the door 11.

The hinge assembly 10 also includes a cover 27 for fitting over the post member 17 in a conventional manner.

In order to deliver electrical power from a source of power in the cabinet 12 to the electrical appliance 15 in the door 11, electrical contact means are provided in the housing 16 and post member 17 of the hinge assembly 10 to make contact for the transfer of power when the door 11 is mounted on the cabinet 12, i.e. when the post member 17 is inserted into the housing 16.

Referring to FIG. 2, in one embodiment, the post member 17 has a first electrical contact means 28 that is mounted in a fixed manner within the tubular portion 25 and that extends downwardly from the tubular portion 25. The contact means 28 is in the form of a DC Power Jack, such as Model PP3-002BH marketed by CUI Inc. of Tualatin, Oreg. ("CUI").

An electrical line 29 (see FIG. 8) extends from the contact means 28 through the tubular portion 25 of the post member 17 and one of the apertures 26 into the door 11 and the electrical appliance 15 therein.

The post member 17 also has a cam member 30 with a circumferential cam surface 31 mating with the circular cam surface 22 of the cam member 21 on the housing 16 to allow the post member 17 and door 11 to move vertically upwardly, as is known, as the door is moved from a closed position over the cabinet 12 to an open position in response to rotation of the tubular portion 25 within the bore 23 of the cam member 21. As is known, the cam surface 22 has notches at predetermined positions to receive a depending detent on the cam member 30 in order to hold the door 11 in a partially opened position.

Figure 3:
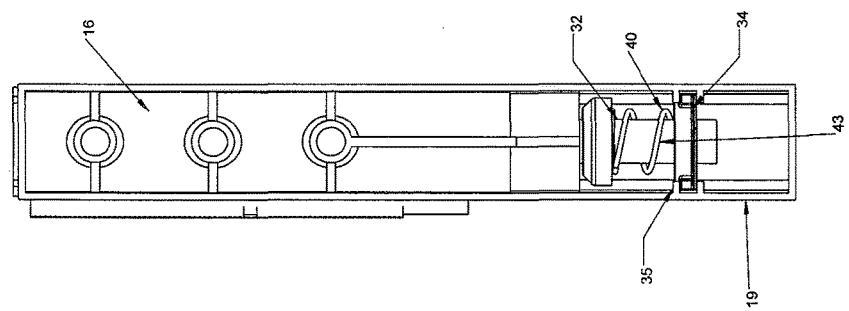
FIG. 3 illustrates a rear view of the housing of the hinge assembly of FIG. 2 and the electrical contact means in the base thereof.

Referring to FIGS. 2 and 3, a second electrical contact means 32 is mounted within the hollow base 19 of the housing 16 below and under the cam member 21 for connection to a source of electrical power in the cabinet 12 (not shown) via an electrical line (not shown) that extends from the electrical contact means 32 into the cabinet 12 (not shown).

Referring to FIG. 3, the electrical contact means 32 includes a mounting plate 34 that is slidably mounted in the base 19 via a pair of vertically spaced apart flanges 35 integral with the base 19 on each of two sides of the plate 34.

Figure 4:
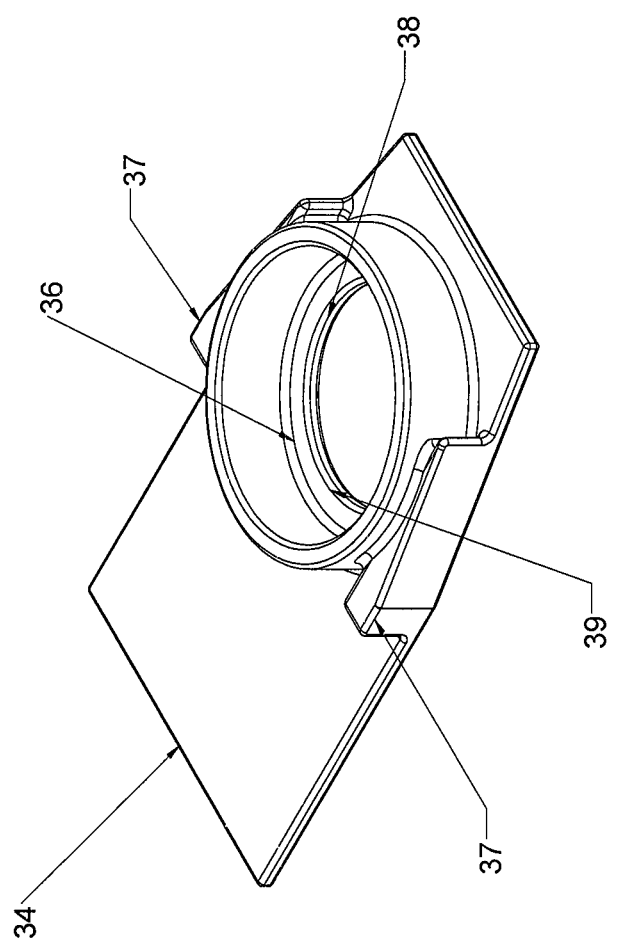
FIG. 4 illustrates a perspective view of one component of the electrical contact means for mounting in the housing base.

As shown in FIG. 4, the mounting plate 34 is flat and has an upstanding annular collar 36 at one end with a pair of flat reinforcing walls 37 on opposite exterior sides of the collar 36 that serve to keep the plate 34 firmly in place between the flanges 35 of the base 19. The plate 34 includes an aperture 38 within the collar 36 and projects into the plane of the collar 36 to define an annular ledge 39.

The ledge 39 is sized to seat a coil spring 40 (see FIG. 3).

Referring to FIGS. 5, 6 and 7, the electrical contact means 32 also includes a metal retaining nut washer 41 having an internal thread 42 for threading onto the top of a DC Power Plug 43 (see FIG. 3), such as a Model PJ-065B, marketed by CUI, and installed in the base 19 of the housing 16.

The nut washer 41 also includes an annular recess 44 on an underside for receiving an upper end of the coil spring 40 and an upstanding annular collar 45 on the topside for abutment with the tubular portion 25 of the post member 17.

The electrical line (not shown) extends from the DC Power Plug 43 of the contact means 32 to connect to the power source (not shown) in the cabinet 12.

Referring to FIG. 2, when the door 11 is closed on the cabinet 12, the tubular portion 25 of the post member 17 abuts the collar 45 of the nut washer 41 and the DC Power Jack 28 extends through the nut washer 41 into the DC Power Plug 43 to form an electrical connection. In addition, the coil spring 40 is compressed between the nut washer 41 and the mounting plate 34.

When the door is opened, the tubular portion 25 of the post member 17 rotates on the collar 45 of the nut washer 41 and raises vertically upwardly while the coil spring 40 expands to bias and maintain the nut washer 41 in contact with the tubular portion 25 of the post member 17. At the same time, the DC Power Jack 28 in the rising post member 17 rotates relative to the stationary DC Power Plug 43 in the base 19 of the housing 16.

Since the DC Power Plug 43 in the base 19 of the housing 16 remains in electrical contact with the DC Power Jack 28 in the post member 17, the electrical appliance 15 in the door 11 is continuously supplied with electrical power. In this respect, the amount of power delivered to the appliance may be maintained at a low rating to avoid electrical shocks to users of the door 11. For example, the DC Power Jack 28 has a rating of 16 VDC @ 8 A and the DC Power Plug 43 has a rating of 24 VDC @ 5 A.

Referring to FIGS. 9 to 12, wherein like reference characters indicate like parts as above, the electrical contact means employed in the hinge assembly 10 may be of a different construction.

For example, as illustrated in FIG. 12, the contact means 28' for mounting in the post member 17 (not shown) is in the form of a barrel 46 with a pair of upstanding leads 47 and an annular flange 48 at the bottom. The contact means 32' for mounting in the base 19 of the housing 16 includes a mounting plate 49 which carries a DC power jack 50 with an upstanding pin 51 for insertion into the barrel 46 to complete an electrical circuit with the leads 47.

In addition, a spring 52 is provided for mounting in the base 19 of the housing 16 for biasing the mounting plate 49 upwardly in order to maintain the pin 51 in electrical contact with the leads 47 within the barrel 46 during pivoting and vertical motion of the post member 17 on the housing 16.

Referring to FIG. 11, a centering button 53 is provided on the base 19 of the housing 16 for centering the spring 52 and maintaining the spring 51 in position.

Figure 9:
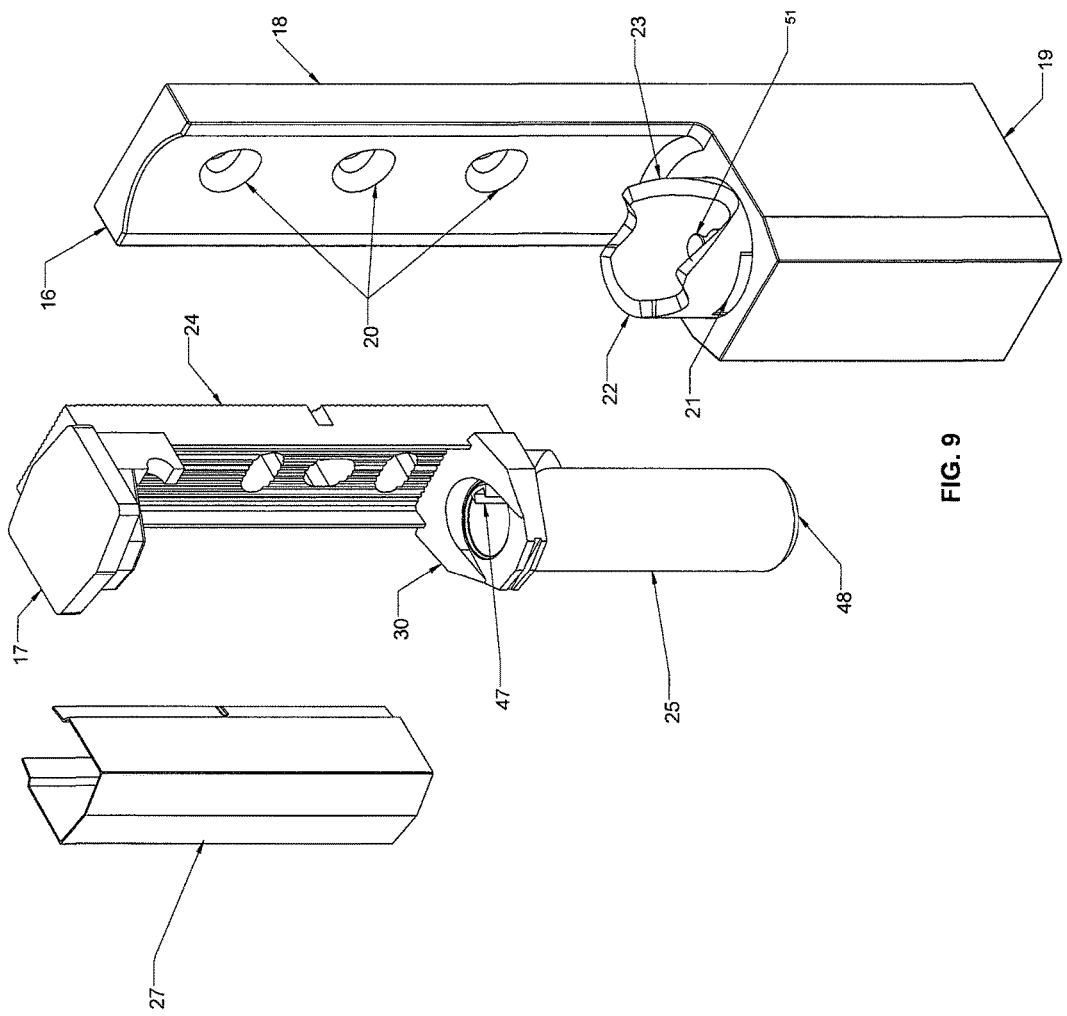
FIG. 9 illustrates an exploded perspective view of a hinge assembly having a second embodiment of electrical contact means in accordance with the invention.
Figure 10:
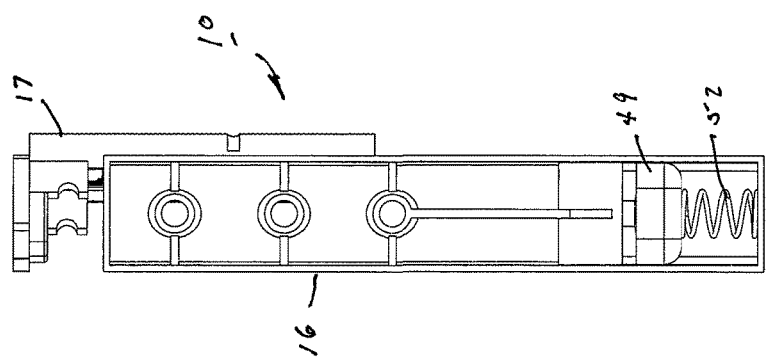
FIG. 10 illustrates a rear view of the housing of the hinge assembly of FIG. 9 and the electrical contact means in the base thereof.

As illustrated in FIG. 9, the barrel 46 (not shown) is fixedly mounted within the tubular portion 25 of the post member 17 with the flange 48 butted against the bottom end of the tubular portion 25 and the two leads 47 of the barrel extending to near the top of the tubular portion 25. The electrical line (not shown) for delivering power into a door would be connected to the two leads 47 and the electrical line (not shown) for delivering power from the source within the cabinet would be connected to suitable terminals of the power jack 50.

In this embodiment, the post member 17 is fitted with the barrel 46 of the contact means 28' and the housing 16 is fitted with the other contact means 32' separate from the post member 17. Thereafter, the tubular portion 25 of the post member 17 is inserted into the bore 23 of the cam member 21 with the pin 51 of the contact means 32' in the housing 16 moving into the barrel 46 to make electrical contact with the two leads 47.

Thereafter, as the post member 17 pivots on the housing 16 an electrical connection is maintained between the two contact means 28' and 32'.

Figure 13:
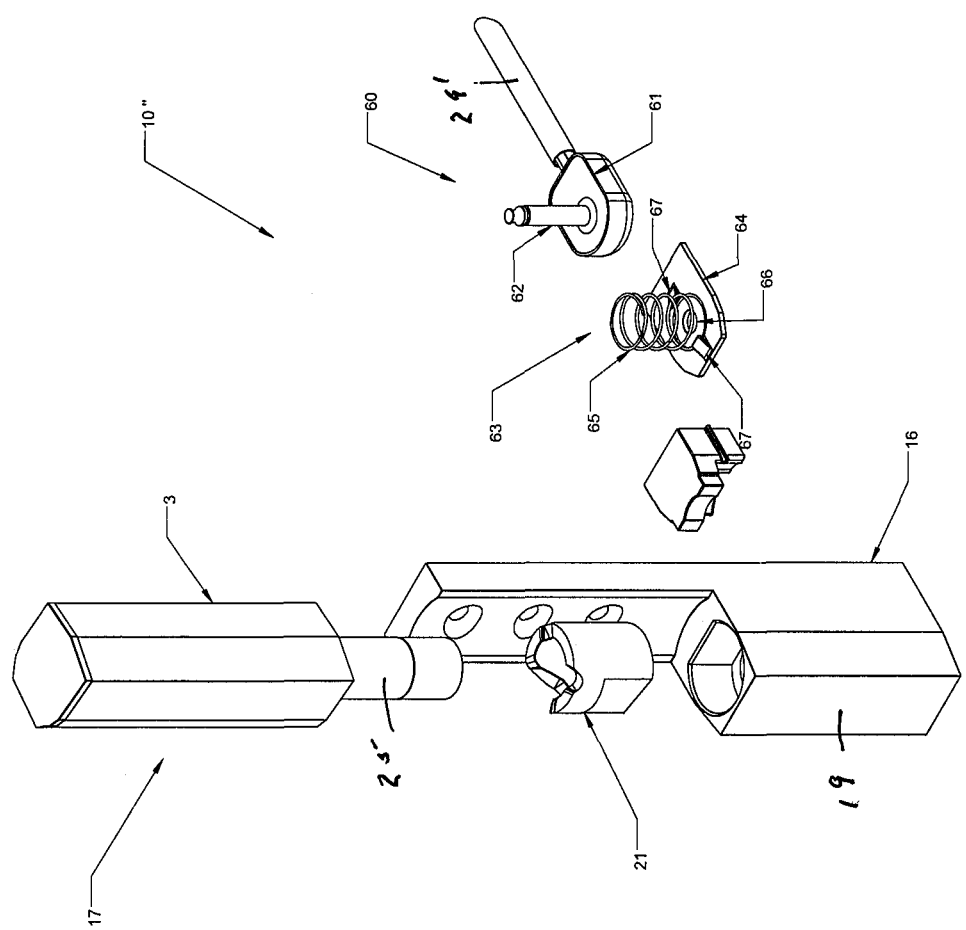
FIG. 13 illustrates an exploded perspective view of a hinge assembly with a third embodiment of a modified electrical contact means in accordance with the invention.
Figure 14:
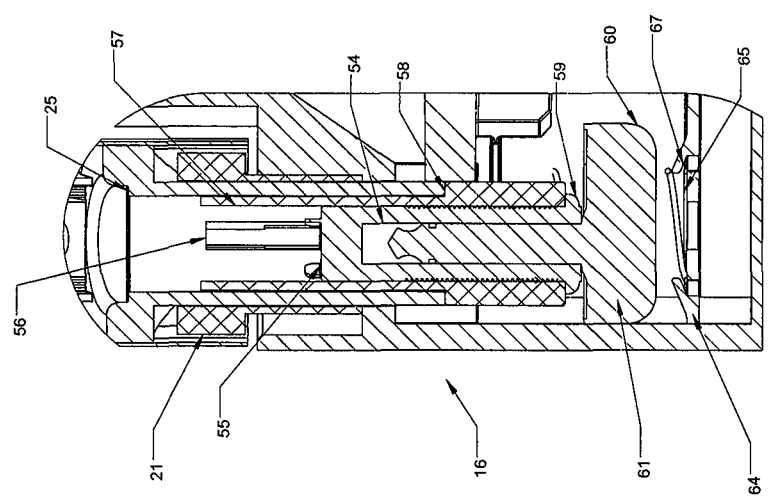
FIG. 14 illustrates a cross-sectional view of the hinge assembly of FIG. 13.

Referring to FIGS. 13 and 14, wherein like reference characters indicate like parts as above, the electrical contact means employed in the hinge assembly 10" may be of a different construction to reduce wear of the electrical contact means during repeated opening and closing of a door on a refrigerated cabinet.

Referring to FIG. 13, the hinge assembly 10" includes a housing 16, a post member 17 and a cam member 21 as above described.

Referring to FIG. 14, one electrical contact means 54 includes an electrically conductive barrel 55 with a pair of upstanding leads 56, such as a Model R51-Y001 Bracket with Connector Switch, marketed by CUI, and a sleeve bearing 57 concentrically fixed on the outer surface of the barrel 55, as by threading.

The electrical contact means 54 is disposed in the depending tubular portion 25 of the post member 17 with the sleeve bearing 57 having a small clearance from the tubular portion 25 to allow the post member 17 to rotate about the electrical contact means 54. In addition, the sleeve bearing 57 has an outer annular shoulder 58 that abuts the bottom end of the tubular portion 25.

The sleeve bearing 57 is made of any suitable material, such as a Nylon® polyamide and is rotatably received on the barrel 55. Thus, as the post member 17 rotates in the cam member 21, the tubular portion 25 of the post member 17 rotates on the sleeve bearing 57.

As illustrated, the barrel 55 has an annular flange 59 at the bottom against which the sleeve bearing 57 abuts.

Referring to FIG. 13, the other electrical contact means 60 such as a Model R51-230 Switchcraft Connector 230 marketed by CUI includes a mounting base 61 that has an upstanding pin 62.

The mounting base 61 is sized to be slid into the base 19 of the housing 16 and is seated on a spring holder assembly 63 formed of an apertured flat plate 64 and a coil spring 65. As illustrated, the coil spring 65 is concentrically positioned about an upstanding button 66 on the plate 64 and is held in place on the plate 64 by a pair of tangs 67 that are integrally formed on the plate 64 to engage over a coil of the spring 65 at diametrically opposed locations.

The pin 62 of the electrical contact means 60 in the housing 16 is sized to be slidably received in the barrel 55 of the electrical contact means 54 in the post member 17 in a friction fit manner that prevents the pin 62 and barrel 55 from rotating relative to each other while allowing the pin 62 and barrel 55 to make electrical contact. As illustrated, the pin 62 is of a circular cross-section and the barrel 55 has a bore of circular cross-section to matingly receive the pin 62. The complementary cylindrical shapes allow for ease of orientation of the pin 62 and barrel 55.

The spring 65 serves multiple purposes. First, when assembling the electrical contact means 60 in the base 19 of the housing 16, the spring 65 serves to hold the electrical contact means 60 in place and to center the pin 62. Second, when the post member 17 is put into place on the housing 16, the spring 65 serves to maintain the pin 62 in electrical contact with the barrel 55 of the electrical contact means 54 in the post member 17.

The spring 65 serves to bias the two electrical contact means 54, 60 vertically upwardly during pivoting and upward movement of the post member 17 while biasing the sleeve bearing 57 into abutment with the tubular portion 25 of the post member 17.

In this embodiment, the post member 17 is fitted with the barrel 55 and sleeve bearing 57 of the contact means 54 and an electrical line 29, as in FIG. 8, extends from the leads 56 of the contact means 54 through the tubular portion 25 of the post member 17 and one of the apertures (not shown) into a door (not shown) and an electrical appliance (not shown) therein. In addition, the housing 16 is fitted with the other contact means 60 separate from the post member 17 and an electrical line 29' extends from the electrical contact means 60 into a cabinet (not shown).

During assembly of the hinge assembly 10", the tubular portion 25 of the post member 17 is inserted into the bore 23 of the cam member 21 with the pin 62 of the contact means 60 in the housing 16 moving into the barrel 55 to make electrical contact therewith.

Thereafter, as the post member 17 pivots on the housing 16 and rotates about the sleeve bearing 57, an electrical connection is maintained between the two contact means 54 and 60 without relative rotation between the two contact means 54 and 60.

Figure 15:
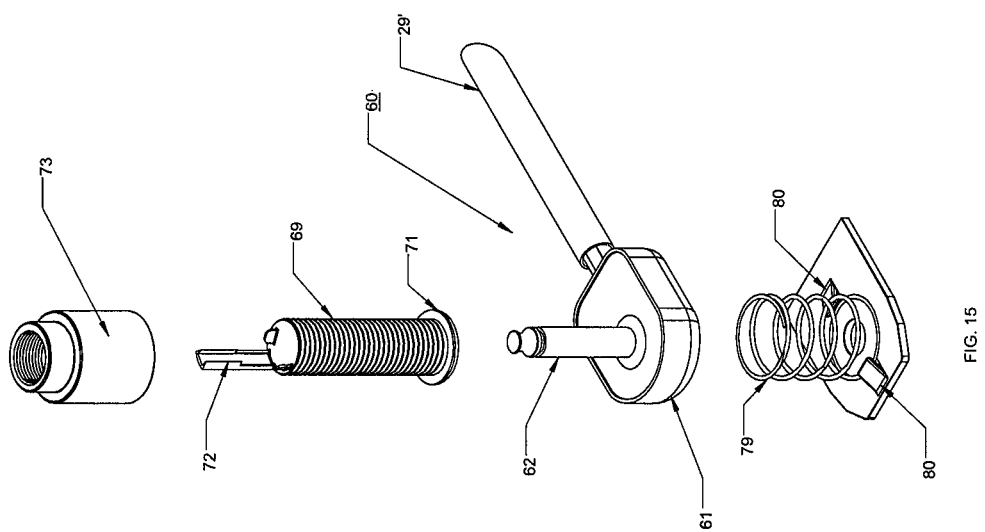
FIG. 15 illustrates an exploded perspective view of a hinge assembly with a fourth embodiment of a modified electrical contact means in accordance with the invention.
Figure 16:
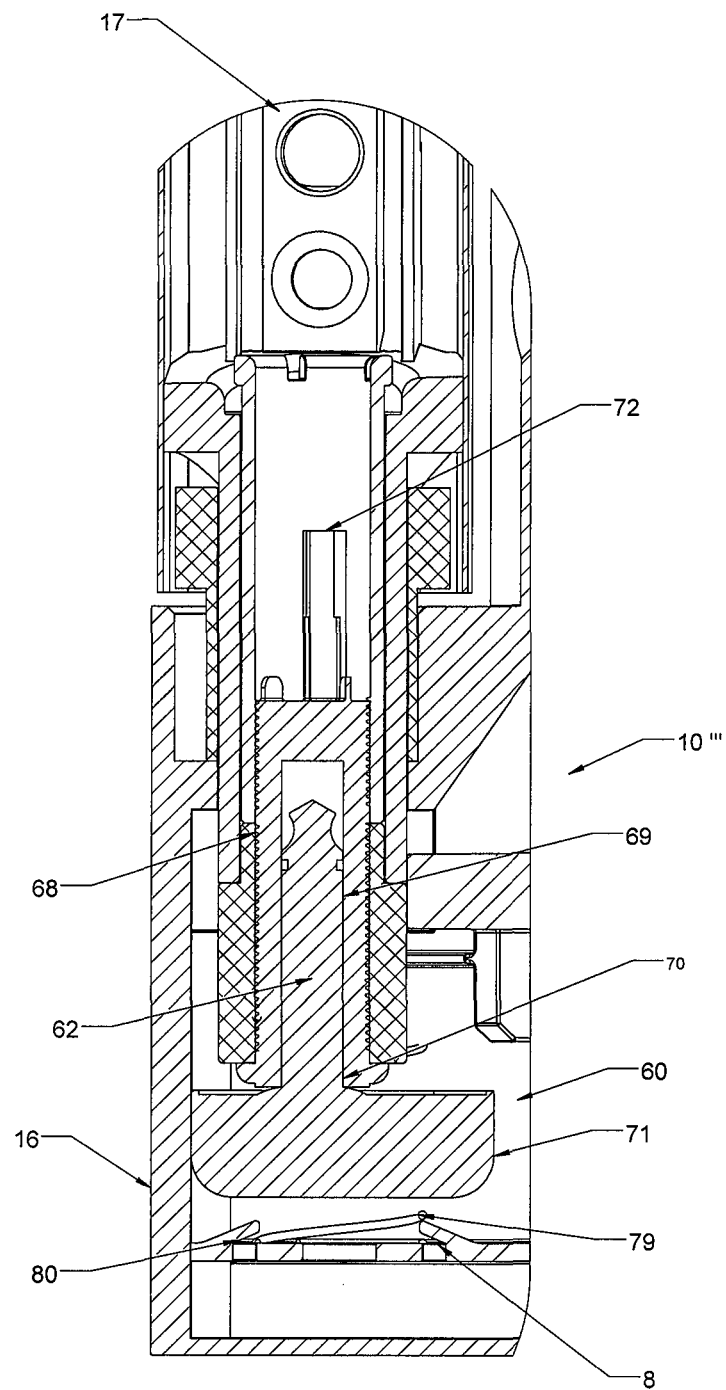
FIG. 16 illustrates a cross-sectional view of the hinge assembly of FIG. 15.
Figure 17:
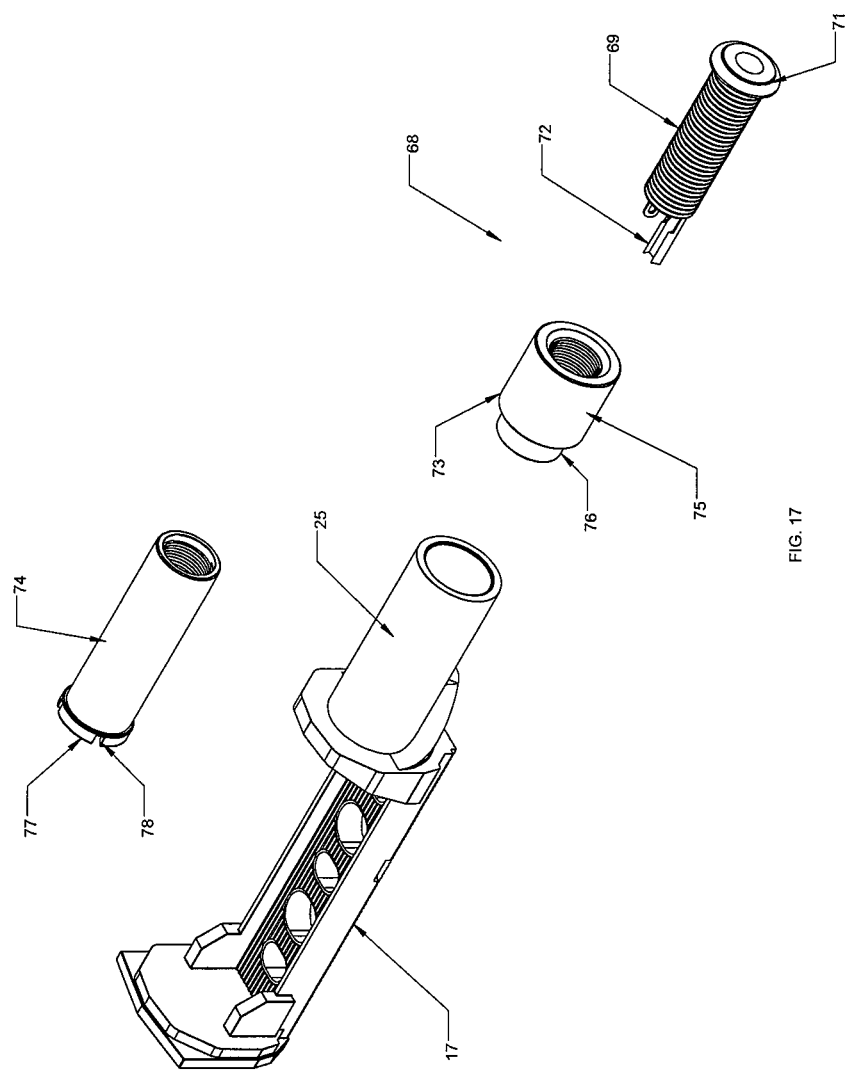
FIG. 17 illustrates an exploded view of the post member and electrical contact means therein of the hinge assembly of FIG. 15.

Referring to FIGS. 15 to 17, wherein like reference characters indicate like parts as above, the electrical contact means employed in the hinge assembly 10''' may be of a different construction to reduce wear of the electrical contact means during repeated opening and closing of a door on a refrigerated cabinet.

In this embodiment, one electrical contact means 68 is constructed for mounting in the post member 17.

As illustrated in FIG. 17, the electrical contact means 68 is, for example, a Switchcraft Connector 152B having an electrically conductive barrel 69 with a bore 70 (see FIG. 16) at one end, an annular collar 71 at that end and a pair of upstanding leads 72 at the opposite end.

In order to mount the electrical contact means 68 in the tubular portion 25 of the post member 17, a female connector cam 73 of tubular shape is secured to the barrel 69. For example, the barrel 69 is externally threaded and the connector cam 73 is internally threaded so as to be threaded onto the barrel 69 with the connector cam 73 abutted against the collar 71 of the barrel 69. In addition, a cam holder 74 of sleeve shape is inserted through the tubular portion 25 of the post member 17 and secured as by threading onto the barrel 69 until abutting with the female connector cam 73.

As illustrated, female connector cam 73 has a main portion 75 of a diameter to match the outer diameter of the tubular portion 25 of the post member 17 and a reduced diameter portion 76 to be slidably received in the tubular portion 25 of the post member 17 with a slight clearance.

The cam holder 74 has an outer diameter to be slidably received in the tubular portion 25 of the post member 17 and be abutted against the reduced diameter portion 76 of the female connector cam 73. The cam holder 74 is internally threaded at least at one end to be threaded onto the barrel 69 and has a collar 77 at the upper end, as viewed, with a plurality of equi-spaced slots 78 (e.g. four slots) to facilitate threading of the cam holder 74 onto the barrel 69, for example, by means of a screwdriver.

The female connector cam 73 and cam holder 74 are made of a plastic material, such as a polyamide sold under the trademark NYLON.

In order to mount the electrical contact means 68 in the post member 17, the female connector cam 73 is threaded onto the barrel 69 and butted against the collar 71.

Next, the female connector cam 73 is inserted into the tubular portion 25 of the post member 17 with the reduced diameter portion 76 butted against the end of the tubular portion.

The cam holder 74 is then inserted through the tubular portion 25 of the post member 17 with a slight radial clearance to insure rotation of the post member 17 on the cam holder 74 during use. In addition, the cam holder 74 is threaded onto the barrel 69 into abutment with the reduced diameter portion 76 of the female connector cam 73.

The cam holder 74 is of a length that the collar 77 is spaced from the top of the tubular portion 25 of the post member 17 thereby allowing the post member 17 to move vertically relative to the cam holder 74 during use.

When assembled, the female connector cam 73 is secured to the barrel 69 for abutment against one end of the tubular portion 25 of the post member 17 with the reduced diameter portion 76 slidably mounted in the tubular portion 25 and the cam holder 74 is secured to the barrel 69 and slidably mounted in the tubular portion 25 with the collar 77 projecting from and for abutting against an opposite end of the tubular portion 25.

Of note, the electrical line 29 (not shown) to an electrical appliance in a door 11 may be threaded through the cam holder 74 and secured to the leads 72 prior to insertion of the barrel 69 and female connector cam 73 into the tubular portion 25 of the post member 17.

The other electrical contact means 60 is constructed for mounting in the housing 16 and is similar to the electrical contact means 60 described above and includes a mounting plate 61 that has an upstanding pin 62 for sliding into the bore 70 of the electrical contact means 68 and making electrical contact therewith.

The mounting plate 61 is sized to be slid into the base 19 of the housing 16 and is seated on a coil spring 79. As illustrated in FIG. 16, the coil spring 79 is concentrically positioned in the housing 16 and is held in place by a pair of tangs 80 that are integrally formed in the housing 16 to engage over a coil of the spring 79 at diametrically opposed locations.

The pin 62 of the electrical contact means 60 in the housing 16 is sized to be slidably received in the bore 70 of the barrel 69 of the electrical contact means 68 in the post member 17 in a friction fit manner that prevents the pin 62 and barrel 69 from rotating relative to each other while allowing the pin 62 and barrel 69 to make electrical contact. As illustrated, the pin 62 is of a circular cross-section and the barrel 69 has a bore 70 of circular cross-section to matingly receive the pin 62. The complementary cylindrical shapes allow for ease of orientation of the pin 62 and barrel 69.

Suitable stops (not shown) in the form of flanges are integrally formed in the interior of the base 19 of the housing 16 in order to limit the upward movement of the mounting plate 61 of the electrical contact means 60 via the spring 79. As above, the spring 79 serves to hold the electrical contact means 60 in place during assembly while centering the pin 62.

After mounting of the hinge assembly 10''' on a door 11 and cabinet 12 as indicated in FIG. 1 and connection of the electrical power lines to a source of electrical power in the cabinet and an electrical appliance 15 in the door 11, the door 11 may be opened and closed on the cabinet 12 multiple times without wearing of the two electrical contact means 60, 68 on each other. Instead, as the post member 17 pivots, the tubular portion 25 rotates on the cam holder 74 while the cam holder 74 remains fixed in place on the barrel 69 of the electrical contact means 68. In this respect, the radial spacing of the tubular portion 25 of the post member 17 prevents the post member from rotating the cam holder 74. Further, a slight friction force between the pin 62 and bore 70 of the two contact means 60, 68 ensures against relative rotation of the pin 62 in the bore 70.

In this embodiment, the post member 17 is fitted with the contact means 68 and the housing 16 is fitted with the other contact means 60 separate from the post member 17. Thereafter, the tubular portion 25 of the post member 17 is inserted into the bore 23 of the cam member 21 with the pin 62 of the contact means 60 in the housing 16 moving into the bore 70 of the barrel 69 of the contact means 68 to make electrical contact therewith.

Of note, the hinge assembly of the invention may be used without the cam member 21 in the housing 16, for example where the post member 17 is required to pivot on the housing 16 without vertical motion. In such a case, a member may be mounted in the base 19 of the housing 16 with a central bore to rotatably receive the tubular portion 25 of the post member 17 and with an annular bearing surface having notches to receive a circumferential cam surface 22 of the post member 17 for positioning a door at intermediate points of opening or closing.

The invention thus provides a hinge assembly for a door, particularly, a door with an insulated glass unit that allows for the delivery of electrical power to an electrical appliance, such as an electrical light fixture and/or electrically conductive bus bars, within the insulated glass unit in the door.

The invention also provides a hinge assembly for any type of door that employs an electrical appliance thereon or therein that allows for the delivery of electrical power to the electrical appliance.

What is claimed is:

1. A hinge assembly for a door mounted on a cabinet comprising
    a housing having a first wall for vertical deposition against the cabinet and a base projecting from a bottom end of said first wall;
    a first electrical contact means including an upstanding pin mounted within said base of said housing for connection to a source of electrical power in the cabinet;
    a post member having a second wall for vertical disposition against the door and a depending tubular portion rotatably disposed in said base of said housing for rotation of said post member relative to said housing;
    a second electrical contact means including a barrel receiving said pin disposed in said post in electrical contact with said first contact means for connection to an electrical appliance in the door; and
    a sleeve bearing concentrically fixed on said barrel of said second electrical contact means and rotatably received in said depending tubular portion of said post member to allow said second electrical contact means to remain stationary relative to said first electrical contact means during rotation of said post member relative to said housing.

2. A hinge assembly for a door mounted on a cabinet comprising
    a housing having a first wall for vertical deposition against the cabinet and a base projecting from one end of said first wall;
    a first electrical contact means including an upstanding pin mounted within said base of said housing for connection to a source of electrical power in the cabinet;
    a post member having a second wall for vertical disposition against the door and a depending tubular portion rotatably disposed in said base of said housing for rotation of said post member relative to said housing;
    a second electrical contact means including a barrel receiving said pin disposed in said post in electrical contact with said first contact means for connection to an electrical appliance in the door; and
    a female connector cam secured to said barrel for abutment against one end of said tubular portion of said post member with a reduced diameter portion slidably mounted in said tubular portion and a cam holder secured to said barrel and slidably mounted in said tubular portion with a collar at one end projecting from and for abutting against an opposite end of said tubular portion.

3. A hinge assembly for a door mounted on a cabinet comprising
    a housing having a first wall for vertical deposition against the cabinet and a base projecting from a bottom end of said first wall;
    a first electrical contact means including an upstanding pin mounted within said base of said housing for connection to a source of electrical power in the cabinet;
    a post member having a second wall for vertical disposition against the door and a depending tubular portion rotatably disposed in said base of said housing for rotation of said post member relative to said housing;
    a second electrical contact means including a barrel receiving said pin disposed in said post in electrical contact with said first contact means for connection to an electrical appliance in the door; and
    a spring in said base biasing said first electrical contact means against said base to maintain said first electrical contact means therein and to center said pin.

4. A hinge assembly for a door mounted on a cabinet comprising
    a housing having a first wall for vertical deposition against the cabinet and a base projecting from one end of said first wall;
    a first cam member mounted in said base, said cam member having a first circular cam surface and a central bore concentrically within said circular cam surface;
    a first electrical contact means mounted within said base of said housing below and under said bore of said cam member for connection to a source of electrical power in the cabinet;
    a post member having a second wall for vertical disposition against the door, a depending tubular portion rotatably disposed within said bore of said first cam member and a second cam member with a circumferential cam surface mating with said first circular cam surface of said cam member to cause the door to be moved vertically between a closed position over the cabinet and an open position in response to rotation of said tubular portion within said bore; and
    a second electrical contact means mounted in said tubular portion in electrical contact with said first contact means.

5. A hinge assembly as set forth in claim 4 wherein said second wall of said post has an aperture therein and which further comprise an electrical line extending from said second electrical contact through said aperture in said post member to an interior of the door.

6. A hinge assembly as set forth in claim 5 wherein said second wall of said post has an aperture therein and which further comprise an electrical line extending from said second electrical contact through said aperture in said post member to an interior of the door.

7. A hinge assembly as set forth in claim 4 wherein said first electrical contact means includes an upstanding pin and said second electrical contact means includes a barrel receiving said pin in electrical contact.

8. A hinge assembly as set forth in claim 4 wherein said first electrical contact means includes an upstanding pin and said second electrical contact means includes a barrel receiving said pin in electrical contact.

9. A hinge assembly as set forth in claim 8 further comprising a female connector cam secured to said barrel for abutment against one end of said tubular portion of said post member with a reduced diameter portion slidably mounted in said tubular portion and a cam holder secured to said barrel and slidably mounted in said tubular portion with a collar at one end projecting from and for abutting against an opposite end of said tubular portion.

10. A hinge assembly for a door mounted on a cabinet comprising
    a housing having a first wall for vertical deposition against the cabinet and a base projecting from one end of said first wall;

a plastic cam member mounted in said base and having a central bore;

a first electrical contact means mounted within said base for connection to a source of electrical power in the cabinet;

a post member having a second wall for vertical disposition against the door and a depending tubular portion rotatably disposed within said bore of said cam member; and a second electrical contact means disposed in said tubular portion in electrical contact with said first contact means and in fixed manner with respect to said first electrical contact means.

11. A hinge assembly as set forth in claim 10 further comprising a bearing sleeve having said second electrical contact means fixedly mounted therein and being disposed in said tubular portion of said post member for pivoting of said post member thereon.

12. A hinge assembly as set forth in claim 11 wherein said first electrical contact means includes an upstanding pin and said second electrical contact means includes a barrel receiving said pin in electrical contact.

13. The combination of a door for a cabinet including an insulated glass unit having at least a pair of glass panes disposed in parallel relation and defining a space therebetween and an electrical appliance within said space; and a hinge assembly for mounting said door on a cabinet including a housing having a first wall for vertical deposition against the cabinet and a base projecting from one end of said first wall, and a post member having a second wall disposed against said door and a depending tubular portion rotatably disposed in said base for rotation of said post member relative to said housing;

a first electrical contact means including an upstanding pin mounted within said base of said housing for connection to a source of electrical power in said cabinet;

a second electrical contact means disposed in said post member and including an electrically conductive barrel receiving said pin in electrical contact at one end thereof in electrical contact with said first contact means and having a pair of leads extending from an opposite end thereof electrically connected to said electrical appliance in the door; and a female connector cam secured to said barrel for abutment against one end of said tubular portion of said post member with a reduced diameter portion slidably mounted in said tubular portion and a cam holder secured to said barrel and slidably mounted in said tubular portion with a collar at one end projecting from and for abutting against an opposite end of said tubular portion, and wherein said tubular portion of said post member is rotatable relative to said cam holder.

* * * * *